United States Patent [19]

Ishigaki

[11] 4,266,296
[45] May 5, 1981

[54] MULTIPATH DISTORTION COMPENSATION CIRCUIT AND METHOD

[75] Inventor: Yukinobu Ishigaki, Yokohama, Japan

[73] Assignee: Victor Company of Japan, Limited, Yokohama, Japan

[21] Appl. No.: 91,938

[22] Filed: Nov. 7, 1979

[30] Foreign Application Priority Data

Nov. 16, 1978 [JP] Japan ............................. 53-140468

[51] Int. Cl.³ .................... H04B 1/10; H03D 3/00
[52] U.S. Cl. ................. 455/303; 455/296; 455/305; 329/132; 329/133
[58] Field of Search ............. 455/212, 214, 215, 219, 455/225, 295, 296, 302, 303, 312, 305; 329/110, 131, 132, 133, 136

[56] References Cited

U.S. PATENT DOCUMENTS

| | | | |
|---|---|---|---|
| 3,568,078 | 3/1971 | Pelchat | 329/110 |
| 3,611,169 | 10/1971 | Hess | 329/132 |
| 3,965,422 | 6/1976 | Tagliaferri | 455/295 |
| 4,166,251 | 8/1979 | Ishigaki et al. | 455/303 |

Primary Examiner—Howard W. Britton
Assistant Examiner—Tommy P. Chin
Attorney, Agent, or Firm—Lowe, King, Price and Becker

[57] ABSTRACT

A multipath distortion compensation circuit comprises an FM detector, an AGC circuit, an envelope detector, a capacitor, a function generator, an analog multiplier, first and second operational circuits, first and second variable delay circuits, and a plurality of switching circuits for producing a demodulated signal having no distortion components caused by multipath interference. The switching circuits are used to selectively constitute one of first and second arrangements by changing the connections among the circuits. The first and second arrangements are respectively used depending on whether the magnitude of a direct wave received by a receiving antenna is greater than that of an indirect wave, such as a reflected wave, also received by the antenna. A suitable compensation signal is produced and is subtracted from the demodulated signal to cancel the distortion components.

13 Claims, 5 Drawing Figures

MULTIPATH DISTORTION COMPENSATION CIRCUIT AND METHOD

FIELD OF THE INVENTION

This invention generally relates to a compensation circuit for the multipath distortion of received electromagnetic radio waves. More specifically, the present invention relates to such a compensation circuit for angle modulated, e.g. FM (frequency-modulated) radio waves.

BACKGROUND OF THE INVENTION

When an angle modulated, e.g. FM, radio wave transmitted from a transmitting antenna reaches a receiving antenna via more than one different propagation path interference may occur between the received signals. The interference is apt to cause the received signal to include distortion components therein. In other words, the distortion (which is referred to as interference distortion hereinafter) of the received signal occurs since both a direct wave and an indirect wave, such as a reflected wave and/or a diffracted wave, are received by the same receiving antenna. The interference distortion which occurs due to the above mentioned reason is called a multipath distortion. The possibility of multipath distortion is relatively high in cities having tall buildings.

A method which has been adopted to reduce or cancel multipath distortion is to use a receiving antenna which has a sharp directivity for receiving only the direct wave or a wave which the antenna is aimed to receive. However, this method does not work effectively when many tall buildings surround a receiving point. Therefore, various types of compensation circuits for reducing the distortion have been provided hitherto. Although these conventional multipath distortion compensation circuits eliminate the distortion components to an extent, the distortion components included in the received signal cannot be removed perfectly since only approximate compensation is performed in these conventional circuits. Therefore, complete elimination of the multipath distortion components by use of these conventional compensation circuits does not necessarily occur.

Furthermore, the conventional compensation circuits properly function only when the magnitude of the direct wave received by a receiving antenna is greater than that of the indirect, i.e. reflected and/or diffracted, wave which is also received by the same antenna. When the magnitude of the indirect wave is greater than that of the direct wave, compensation of the distortion components is not adequately performed.

SUMMARY OF THE INVENTION

The present invention has been developed in order to remove the above described disadvantages and drawbacks inherent in the conventional multipath distortion compensation circuits.

It is, therefore, a primary object of the present invention to provide an improved multipath distortion compensation circuit which accurately eliminates distortion components due to different propagation paths regardless of whether the magnitude of the direct wave is greater or less than that of the indirect wave.

To effectively eliminate the multipath interference distortion components in the above mentioned both cases, a first arrangement cancels the distortion components when the magnitude of the direct wave is greater than that of the indirect wave and a second arrangement cancels the distortion components when the magnitude of the direct wave is less than that of the indirect wave. These two arrangements are selectively used by switching from one to another. Various circuits and elements are used in both the first and second arrangements so that the number of circuits and elements is remarkably less than the number which would be used if the first and second arrangements were independently provided.

In accordance with the present invention there is provided a multipath distortion compensation circuit comprising: (a) a demodulator responsive to an angle modulated signal for producing a demodulated signal at its output terminal; (b) an automatic gain control circuit responsive to the angle modulated signal for maintaining the average magnitude of the angle modulated signal constant; (c) an envelope detector responsive to the output signal of the automatic gain control circuit; (d) a capacitor for blocking direct current components contained in the output signal of the envelope detector; (e) a function generator having a predetermined input signal vs. output signal characteristic; (f) an analog multiplier having first and second input terminals and an output terminal, the first input terminal being responsive to the output signal of the function generator; (g) first and second operational circuits, each of which has first and second input terminals and an output terminal, the second input terminal of the first operational circuit being responsive to the output signal of the analog multiplier, the first input terminal of the second operational circuit being responsive to the output signal of the first operational circuit, and the second input terminal of the analog multiplier being responsive to the output signal of the second operational circuit; (h) first and second delay circuits, the second delay circuit being responsive to the output signal of the envelope detector through the capacitor; and (i) switching means which assumes first and second positions respectively. When the switching means assumes the first position, the output terminal of the demodulator is connected to the first input terminal of the first operational circuit, the output terminal of the first operational circuit is connected to the input terminal of the first delay circuit, the output terminal of the first delay circuit is connected to the second input terminal of the second operational circuit, the output terminal of the envelope detector is connected via the capacitor to the input terminal of the function generator. On the other hand when the switching means assumes the second position, the output terminal of the demodulator is connected to the input terminal of the first delay circuit and to the second input terminal of the second operational circuit, the output terminal of the first delay circuit is connected to the first input terminal of the first operational circuit, and the output terminal of the second delay circuit is connected to the input terminal of the function generator.

In accordance with the present invention there is further provided a method of cancelling multipath interference distortion components included in a composite angle modulated signal produced by direct and indirect waves which are received by a receiving antenna, comprising the steps of: (a) demodulating the composite angle modulated signal to produce a demodulated signal; (b) maintaining the average magnitude of the composite angle modulated signal constant; (c) producing a signal indicative of the envelope of the composite angle modulated signal having constant average magnitude; (d) blocking direct current components contained in the signal indicative of the envelope to transmit only alternating current components; (e) providing a characteristic having a predetermined function to a first signal by means of a function generator to produce an output signal; (f) retarding a second signal by an interval by means of a first delay circuit to produce a first retarded signal; (g) retarding the alternating components by the interval by means of a second delay circuit to produce a second retarded signal; (h) subtracting a compensation signal from a third signal by means of a first operational circuit that produces an output signal; (i) subtracting a fourth signal from the output signal of the first operational circuit by means of a second operational circuit to produce an output signal; (j) analog multiplying the output signal of said function generator by the output signal of the second operational circuit for producing the compensation signal; and (k) switching the first, second, third and fourth signals respectively applied to the function generator, the first delay circuit, and the first and second operational circuits, for supplying said function generator with the alternating components as the first signal, supplying the first delay circuit with the output signal of the first operational circuit as the second signal, supplying the first operational circuit with the demodulated signal as the third signal, supplying the second operational circuit with the first retarded signal as the fourth signal when the magnitude of the direct wave is greater than that of the indirect wave, and on the other hand for supplying the function generator with the second retarded signal as the first signal, supplying the first delay circuit with the demodulated signal as the second signal, supplying the first operational circuit with the first retarded signal as the third signal, and supplying the second operational circuit with the demodulated signal as the fourth signal when the magnitude of the direct wave is less than that of the indirect wave.

The function generator is arranged so it has an expansion function defined by a hyperbola passing through the origin of X-Y co-ordinate system, which hyperbola is expressed in terms of:

$Y = X/(1 - 2X)$.

Alternatively, the function generator has a hyperbola passing through the origin of function defined by an X-Y co-ordinate system, which hyperbola is expressed in terms of:

$Y = X/(1 + 2X)$.

The expansion and compression functions provide a suitable compensation signal to cancel the distortion components.

The first and second delay circuits may be of variable type. The delay times of these first and second delay circuits are gang controlled to change the delay times thereof simultaneously to correspond to the delay time of the indirect wave with respect to the direct wave.

BRIEF DESCRIPTION OF THE DRAWINGS

These and other objects and features of the present invention will become more readily apparent from the following description of a preferred embodiment taken in conjunction with the accompanying drawings in which.

DETAILED DESCRIPTION OF THE PREFERRED EMBODIMENT

Figure 1:
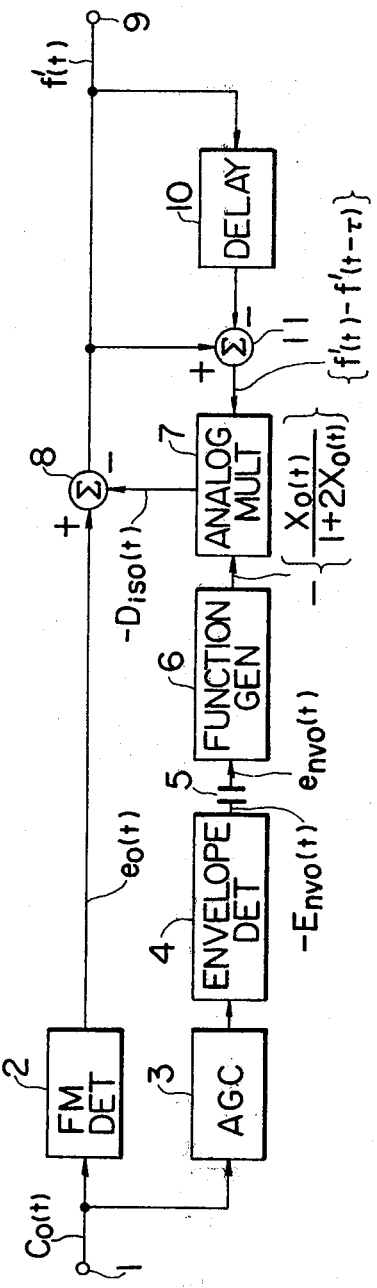
FIG. 1 is a schematic block diagram of a first arrangement which is useful for understanding the multipath distortion compensation circuit according to the present invention.

Prior to describing the preferred embodiment of the present invention, the multipath distortion process is described in connection with mathmatical formulas. It is assumed that an angle modulated signal, such as a frequency modulated (FM) signal, is transmitted from a transmitting antenna of a broadcasting station. The angular frequency of the carrier and the modulation signal of the angle modulated signal are respectively expressed in terms of $\omega_c$ and $f'(t)$. The FM radio wave is received by a receiving antenna which is located at a given point. If there is no obstacle, such as a tall building, between the transmitting antenna and the receiving antenna and/or around the receiving antenna, only a direct radio wave $C_D(t)$ is received by the receiving antenna. However, there is a chance that an indirect radio wave $C_R(t)$, such as a reflected wave, is also received by the receiving antenna. For instance, the FM radio wave transmitted from the transmitting antenna is apt be reflected by a building or other obstacles to provide an additional propagation path between the transmitting and receiving antennas.

Since the indirect wave, such as a reflected wave, is transmitted through a propagation path deriving a greater length than that of the direct wave propagation path, the indirect wave is received by the receiving antenna after the direct wave has been received. In other words, the indirect $C_R(t)$ wave has a delay time $\tau$ with respect to the direct wave $C_D(t)$. The direct wave $C_D(t)$ and the delayed indirect wave $C_R(t)$ are simultaneously received by the receiving antenna, whereby a composite signal $C_O(t)$ is developed at the receiving antenna. The direct wave $C_D(t)$, the indirect wave $C_R(t)$ and the composite wave or signal $C_O(t)$ are respectively expressed by the following formulas:

$$C_D(t) = A_1 \cos \{\omega_c \cdot t + f(t)\} \qquad (1)$$

$$C_R(t) = A_2 \cos \{\omega_c \cdot t + f(t-\tau) - \omega_c \cdot \tau\} \qquad (2)$$

$$\begin{aligned} C_O(t) &= C_D(t) + C_R(t) \\ &= E_{nvo}(t) \cdot \cos \{\omega_c \cdot t + f(t) + \phi_O(t)\} \end{aligned} \qquad (3)$$

wherein $A_1$ and $A_2$ are constants respectively indicative of the magnitudes of the direct wave $C_D(t)$ and the indirect wave $C_R(t)$.

In the above Eq. (3), $E_{nvo}(t)$ is a term that indicates the amplitude variation of the composite signal $C_O(t)$, i.e. the interfering FM signal, and $\phi_O(t)$ is a term indicative of the phase variation so that when $C_D(t) > C_R(t)$, these terms are respectively expressed by the following Equations (4) and (5):

$$E_{nvo}(t) = \sqrt{1 + K_o^2 + 2K_o \cdot \cos\{f(t) - f(t - \tau) + \omega_c \cdot \tau\}} \quad (4)$$

$$\phi_o(t) = -\tan^{-1} \frac{K_o \cdot \sin\{f(t) - f(t - \tau) + \omega_c \cdot \tau\}}{1 + K_o \cdot \cos\{f(\tau) - f(t - \tau) + \omega_c \cdot \tau\}} \quad (5)$$

In the above equations, $K_O$ stands for $A_2/A_1$. When such an interfering FM signal $C_O(t)$ is detected by an FM detector (demodulator), a demodulated output signal $e_O(t)$ defined by the following Equation (6) is obtained:

$$e_O(t) = f'(t) - \{f'(t) - f'(t - \tau)\} \frac{K_o^2 + K_o \cdot \cos\{f(t) - f(t - \tau) + \omega_c \cdot \tau\}}{1 + K_o^2 + 2K_o \cdot \cos\{f(t) - f(t - \tau) + \omega_c \cdot \tau\}} \quad (6)$$

Eq. (6), the first term of the right member, i.e. f'(t), indicates a detected signal which does not include distortion components, while the second term of the right member indicates the distortion components which may be abbreviated by $D_{iso}(t)$. These distortion components $D_{iso}(t)$ correspond to the multipath interference distortion. Therefore, the function of a multipath distortion compensation circuit is to eliminate the above defined distortion components.

Figure 2:
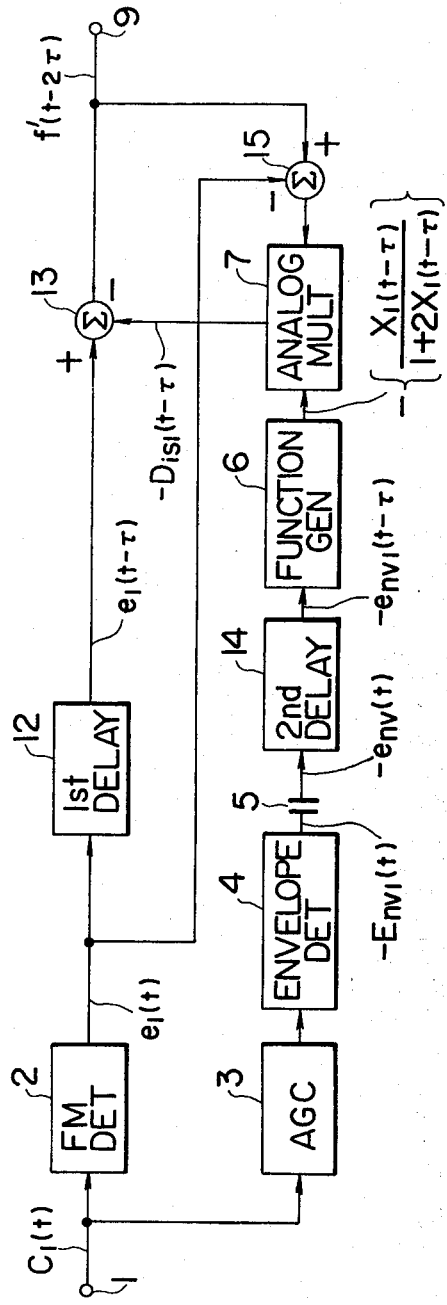
FIG. 2 is a schematic block diagram of a second arrangement which is also useful for understanding the present invention.
Figure 5:
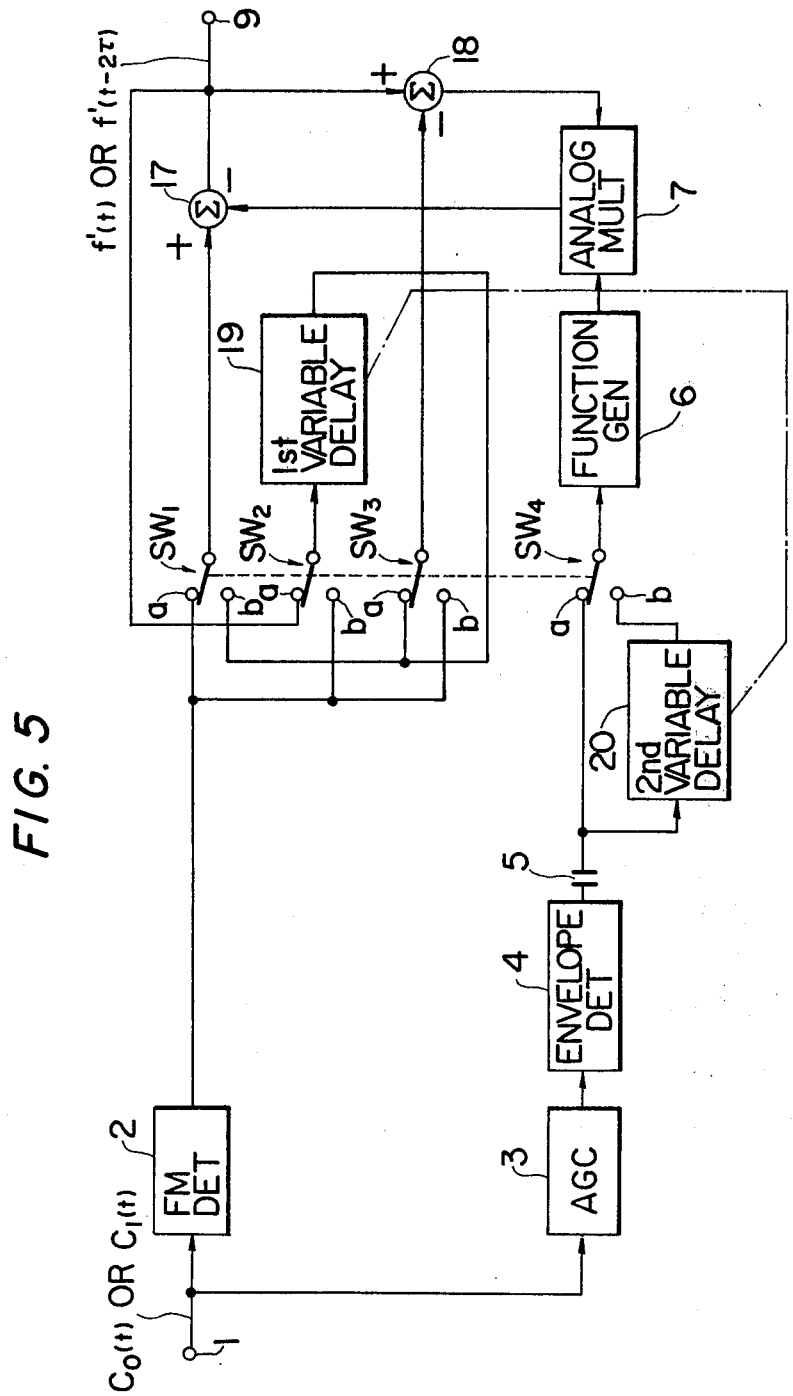
FIG. 5 is a schematic block diagram of the preferred embodiment of the multipath distortion compensation circuit according to the present invention.

In accordance with the present invention, a first multipath distortion compensation arrangement which is illustrated in FIG. 1, and a second multipath distortion compensation arrangement which is illustrated in FIG. 2 are selectively switched by means of a switching circuit as shown in FIG. 5. The first arrangement eliminates distortion components when the magnitude of the direct wave $C_D(t)$ is greater than that of the indirect wave $C_R(t)$, while the second arrangement eliminates the distortion components when the magnitude of the direct wave $C_D(t)$ is less than that of the indirect wave $C_R(t)$. It will be understood that several circuits in the arrangement of FIG. 5 function as circuits in both of the arrangements of FIG. 1 and FIG. 2. In other words, most of the circuits included in the FIG. 5 arrangement are used in both of the above described cases. Before describing the construction and the operation of the arrangement of FIG. 5, the first and second arrangements of FIG. 1 and FIG. 2 are described since it is easier to understand the FIG. 5 arrangement after the first and second arrangements are understood.

Reference is now made to FIG. 1, a block diagram form of the above mentioned first arrangement which is adapted to eliminate multipath distortion components when the magnitude of the direct wave $C_D(t)$ received by a receiving antenna is greater than that of the indirect wave $C_R(t)$, such as a reflected wave. The first arrangement comprises an input terminal 1, an FM detector (demodulator) 2, an AGC (automatic gain control) circuit 3, an envelope detector circuit 4, capacitor 5, a function generator 6, an analog multiplier 7, a first operational circuit 8, an output terminal 9, a delay circuit 10, and a second operational circuit 11.

Figure 3:
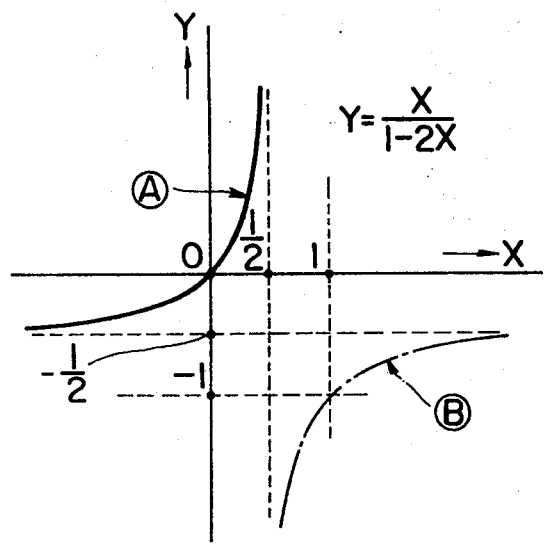
FIG. 3 is a graphical representation of the characteristic of the function generator shown in FIG. 1, FIG. 2 and FIG. 5.
Figure 4:
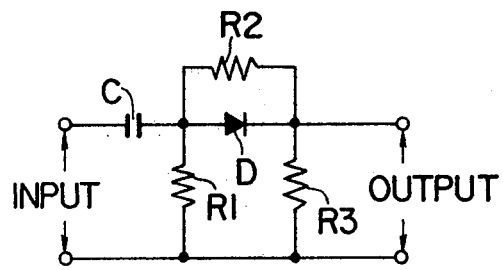
FIG. 4 is a detailed wiring diagram of the function generator shown in FIG. 1, FIG. 2 and FIG. 5.

The input terminal 1 is connected to an output terminal of an input stage (not illustrated) which usually includes a tuning circuit, to receive an FM signal having a carrier frequency $\omega_c$. The input terminal 1 is connected to an input terminal of the FM detector 2 and to an input terminal of the AGC circuit 3. The output terminal of the FM detector 2 is connected to a noninverting input terminal (+) of the first operational circuit (subtractor) 8, the output terminal of which is connected to the output terminal 9. The output terminal of the AGC circuit 3 is connected to an input terminal of the envelope detector 4 the output terminal of which is connected via the capacitor 5 to an input terminal of the function generator 6. The detailed circuit diagram of the function generator 6 is shown in FIG. 4, while the characteristic of the same is shown in the graph of FIG. 3; a detailed description in connection with the function generator 6 is made infra. The output terminal of the function generator 6 is connected to a first input terminal of the analog multiplier 7, the output terminal of which is connected to an inverting input terminal (−) of the first operational circuit 8. The output terminal is connected to an input terminal of the delay circuit 10 and to a noninverting input terminal (+) of the second operational circuit (subtractor) 11. The output terminal of the delay circuit 10 is connected to an inverting input terminal (−) of the second operational circuit 11, the output terminal of which is connected to a second input terminal of the analog multiplier 7. The output terminal 9 may be connected to a suitable audio frequency amplification circuit (not shown).

The operation of the first arrangement of FIG. 1 is described infra. An inut FM signal applied to the input terminal 1 is a composite angle modulated signal $C_O(t)$ which is expressed by Eq. (3). This composite FM signal $C_O(t)$ is applied to the input terminal of the FM detector 2 so that the FM detector 2 produces a detected (demodulated) signal $e_O(t)$ which is expressed by Eq. (6). By assuming that the FM detector 2 functions under the conditions such that the interference ratio $K_O$ is smaller than 1, the term $K_O^2$ in Eq. (6) can be neglected. Accordingly, Eq. (6) may be rewritten as follows:

$$\begin{aligned} e_O(t) &= f'(t) - D_{iso}(t) \quad (7) \\ &= f'(t) - \{f'(t) - f'(t - \tau)\} \frac{K_o \cdot \cos\{f(t) - f(t - \tau) + \omega_c \cdot \tau\}}{1 + 2K_o \cdot \cos\{f(t) - f(t - \tau) + \omega_c \cdot \tau\}} \end{aligned}$$

The AGC circuit 3 suppresses the variation in the level of the received composite signal $C_O(t)$ so as to maintain the average signal magnitude constant. The the average magnitude of the received signal must be maintained constant because the distortion elimination is not correctly performed if the signal intensity is not held constant. If there is a variation in the magnitude of the output signal of the envelope detector 4, which follows the AGC circuit 3, as occurs in response to variations in the electromagnetic field intensity and/or the direction of the reflected wave changes, the operational levels in the following circuits deviate from the correct level to prevent accurate compensation. The output signal of the AGC circuit 3 is applied to the envelope detector 4 which detects the variation components, i.e. the envelope of the AGC output signal, in the form of a negative polarity signal. Envelope $E_{nvo}(t)$ as expressed by Eq. (4), can be approximated as follows by assuming that $K_o < 1$ and expanding Eq. (4) in series:

$$E_{nvo}(t) \approx 1 + K_o \cdot \cos\{f(t) - f(t-\tau) + \omega_c \cdot \tau\} \quad (8)$$

The negative polarity output signal of the envelope detector 4, which is then supplied to the function generator 6 through the capacitor 5 which blocks direct current components. Therefore only alternating current components are fed to the function generator 6. This envelope signal $-e_{nvo}(t)$ which does not include direct current components is expressed by the following equation:

$$-e_{nvo}(t) = -X_o(t) = -K_o \cdot \cos\{f(t) - f(t-\tau) + \omega_c \cdot \tau\} \quad (9)$$

The function generator 6 generates an output signal which enables a compensation signal to be produced by the following stage; the output signal of generator 6 corresponds to the distortion components expressed by the second terms of the right member of Eq. (7). In detail the function generator 6 causes envelope signal $-e_{nvo}(t)$ to be transformed in amplitude as a hyperbolic function in order to produce the above mentioned output signal on which the compensation signal is based. The hyperbolic function is expressed by the following formula:

$$Y = X/(1-2X) \quad (10)$$

A pair of hyperbolic defined by the above Eq. (10) are shown in the graph of FIG. 3; in the preferred embodiment of the present invention, the expansion function is defined by the portion of the hyperbola designated by curve A. Of the two hyperbolic curves defined by Eq. (10), the one which is used passes through the origin of the X-Y co-ordinate system. In the graph of FIG. 3, the input voltages of the function generator 6 are plotted along the X-axis, while the output voltages of the same are plotted along the Y-axis.

FIG. 4 is a detailed circuit diagram of an example of the function generator 6. The function generator 6 comprises a capacitor C and a diode D connected in series between the input and output terminals of the function generator 6, a first resistor R1 interposed between the junction connecting the capacitor C and the cathode of the diode D and ground, a second resistor R2 connected across the diode D, and a third resistor R3 connected between the output terminal and ground. This function generator 6 operates as a well known voltage expandor circuit.

The output signal of the function generator 6 is obtained by substituting Eq. (9) into Eq. (10) as follows:

$$-\left\{\frac{X_o(t)}{1+2X_o(t)}\right\} = -\frac{K_o \cdot \cos\{f(t) - f(t-\tau) + \omega_c \cdot \tau\}}{1 + 2K_o \cdot \cos\{f(t) - f(t-\tau) + \omega_c \cdot \tau\}} \quad (11)$$

The above expressed output signal of the function generator 6 is fed to the first input terminal of the analog multiplier 7 and is multiplied by an output signal of the second operational circuit 11 which is discussed hereinafter.

On the other hand, a detected signal f'(t) which does not include distortion components $D_{iso}(t)$, is derived from the output terminal of the first operational circuit 8 as is described infra, and this detected signal is applied to the delay circuit 10 so that the detected signal f'(t) is retarded by an interval corresponding to the delay time $\tau$ of the reflected wave $C_R(t)$ with respect to the direct wave $C_D(t)$. Therefore, the output signal of the delay circuit 10 is expressed by f'(t−τ). The output signal of the delay circuit 10 is applied to the second input terminal (−) of the second operational circuit 11 which receives at its first input terminal (+) the detected signal f'(t) from the output terminal of the first operational circuit 8. The second operational circuit 11 thus produces an output signal expressed in terms of {f'(t)−f'(t−τ)} by subtracting the output signal f'(t−τ) of the delay circuit 10 from the detected signal f'(t) to supply the analog multiplier 7 with the output signal.

The analog multiplier 7 which is responsive to the output signal of the function generator 6 and the output signal of the second operational circuit 11, produces the compensation signal $-D_{iso}(t)$. The distortion components expressed by the second terms of the right member of Eq. (7) are cancelled or offset by compensation signal $-D_{iso}(t)$. To this end the output signal of the function generator 6 is multiplied by the output signal of the second operational circuit 11 in multiplier 7. The compensation signal $-D_{iso}(t)$ is applied to the second input terminal (−) of the first operational circuit 8 so that the compensation signal $-D_{iso}(t)$ is subtracted from the detected signal $e_o(t)$, resulting in the production of the aforementioned detected signal f'(t) which does not include distortion components $D_{iso}(t)$. This detected signal f'(t) is then applied to the output terminal 9 to be delivered to the following stage such as an audio frequency amplifier.

In the above, it has been described that the envelope detector 4 produces a negative polarity signal $-E_{nvo}(t)$; the reason for this is described infra. If the envelope detector 4 is so constructed that it produces a positive polarity output signal, the analog multiplier 7, the first operational circuit 8, the delay circuit 10 and the second operational circuit 11 constitute a positive feedback loop in order to produce a compensation signal. Although no problem would occur if the characteristics of these circuits were ideal, such ideal characteristics cannot usually be obtained. Therefore, the positive feedback loop is apt to mulfunction. To avoid such mulfunctions, an inverting amplifier is provided at the output side of the function generator 6 or at the output side of the analog multiplier 7 in order to cancel the distortion components $D_{iso}(t)$ if the arrangement is such that the output signal of the analog multiplier 7 is subtracted from the detected output signal $e_o(t)$ of the FM detector 2. According to the present invention, however, since only the negative envelope of the output signal of the AGC circuit 3 is detected in the form of a negative polarity signal, by means of the envelope detector 4, such a positive feedback loop is not provided, whereby the above mentioned inverting amplifier is not required, to provide a simple circuit for offsetting the distortion components $D_{iso}(t)$.

Although in the above description, the delay circuit 10 is responsive to the output signal f'(t) of the first operational circuit 8, while the same signal f'(t) is applied to the noninverting input terminal (+) of the second operational circuit 11, the output signal $e_o(t)$ of the FM detector 2 may be directly applied to the input terminal of the delay circuit 10 and to the noninverting input terminal (+) of the second operational circuit 11. In case delay circuit 10 and the second operational circuit 11 are responsive to the detected signal $e_o(t)$, the multipath distortion can be eliminated in the same way although the elimination efficiency is a little lower than that in the arrangement of FIG. 1. The lower efficiency occurs because the magnitude of the distortion components {f'(t)−f'(t−τ)} included in the output signal of the second operational circuit 11 is so small that it can be neglected by considering the analog multiplication operation performed by analog multiplier 7. It is to be noted that a switching operation is performed in the analog multiplier to obtain a product of two input quantities. In detail, the output signal of the function generator 6 is repeatedly switched in accordance with the polarity of the output signal of the second operational circuit 11 so that the polarity of the output signal of the function generator 6 is changed as the polarity of the output signal of the second operational circuit 11 changes from positive to negative. Therefore, the distortion components actually contained in the output signal of the second operational circuit 11 have a negligible influence on the output signal of the analog multiplier 7.

Turning to FIG. 2, which shows the aforementioned second arrangement, the arrangement is similar to that of the first arrangement of FIG. 1 and therefore, like elements and circuits are designated by the same reference numerals. The second arrangement comprises an input terminal 1, an FM detector 2, an AGC circuit 3, an envelope detector 4, a capacitor 5, a function generator 6, an analog multiplier 7, first and second operational circuits 13 and 15, first and second delay circuits 12 and 14, and an output terminal 9. The input terminal 1 is connected to the input terminals of the FM detector 2 and the AGC circuit 3 in the same manner as in the first arrangement, while the envelope detector 4 and the capacitor 5 are also arranged following the AGC circuit 3. However, the stage following the FM detector 2 and another stage following the capacitor 5 are respectively different from those of the first arrangement.

The output terminal of the FM detector 2 is connected to an input terminal of the first delay circuit 12 the output terminal of which is connected to a noninverting input terminal (+) of the first operational circuit. The output terminal of the FM detector 2 is further connected to an inverting input terminal (−) of the second operational circuit 15, the output terminal of which is connected to an input terminal of the analog multiplier 7. The output terminal of the first operational circuit 13 is connected to the output terminal 9 and to a noninverting input terminal (+) of the second operational circuit 15. The output terminal of the envelope detector 4 is connected via the capacitor 5 to an input terminal of the second delay circuit 14, the output terminal of which is connected to an input terminal of the function generator 6. The output terminal of the function generator 6 is connected to a first input terminal of the analog multiplier 7, the output terminal of which is connected to an inverting input terminal (−) of the first operational circuit 13.

The operation of the second arrangement of FIG. 2 is described in detail infra by means of mathmatical analysis. It is assumed that a composite FM signal $C_1(t)$ produced by a direct wave $C_D(t)$ and a reflected wave $C_R(t)$ are applied to the input terminal 1, where the magnitude of the reflected wave or signal $C_R(t)$ is greater than that of the direct wave or signal $C_D(t)$. Thus the composite signal $C_1(t)$ is expressed by the following formula:

$$C_1(t) = E_{nv}(t) \cdot \cos \{\omega_c t - \omega_c \tau + f(t-\tau) + \phi_1(t)\} \quad (12)$$

In the above Eq. (12), $E_{nv}(t)$ indicates amplitude variation, while $\phi_1(t)$ indicates phase variation and these two terms are respectively represented as follows:

$$E_{nv}(t) = \sqrt{1 + K_1^2 + 2K_1 \cdot \cos \{f(t-\tau) - f(t) - \omega_c \cdot \tau\}} \quad (13)$$

-continued
$$\phi_1(t) = -\tan^{-1} \frac{K_1 \cdot \sin \{f(t-\tau) - f(t) - \omega_c \cdot \tau\}}{1 + K_1 \cdot \cos \{f(t-\tau) - f(t) - \omega_c \cdot \tau\}} \quad (14)$$

In the above Eqs. (13) and (14), $K_1$ represents $A_1/A_2$, the ratio of the magnitude of the direct wave $C_D(t)$ to the magnitude of the reflected wave $C_D(t)$, and therefore, $K_1$ corresponds to the interfering ratio.

Meanwhile, the output signal of the FM detector 2, which signal is a detected signal $e_1(t)$, is expressed by the following equation:

$$e_1(t) = f'(t-\tau) - \quad (15)$$
$$\{f'(t-\tau) - f'(t)\} \frac{K_1^2 + K_1 \cdot \cos \{f(t-\tau) - f(t) - \omega_c \cdot \tau\}}{1 + K_1^2 + 2K_1 \cdot \cos \{f(t-\tau) - f(t) - \omega_c \cdot \tau\}}$$

In the above Eq. (15), the first terms of the right member, i.e. $f'(t-\tau)$, indicate a detected signal of the reflected signal $C_R(t)$ having no multipath distortion components, while the second terms of the right member of the above Eq. (15) indicate multipath distortion components $D_{is}(t)$. Since the interfering ratio $K_1$ is such that $K_1 < 1$, the detected output signal $e_1(t)$ from the FM detector 2 is represented by the following equation:

$$e_1(t) = f'(t-\tau) - D_{is}(t) \quad (16)$$
$$= f'(t-\tau) -$$
$$\{f'(t-\tau) - f'(t)\} \frac{K_1 \cdot \cos \{f(t-\tau) - f(t) - \omega_c \cdot \tau\}}{1 + 2K_1 \cdot \cos \{f(t-\tau) - f(t) - \omega_c \cdot \tau\}}$$

Futhermore, the output signal, i.e. an envelope signal $-E_{nv}(t)$, of the envelope detector 4 which detects a negative polarity envelope, is expressed by the following equation:

$$-E_{nv}(t) = -[1 + K_1 \cos \{f(t-\tau) - f(t) - \omega_c \tau\}] \quad (17)$$

The envelope signal is transmitted through the capacitor 5. Therefore, direct current components are removed from the envelope signal $-E_{nv}(t)$ so that a secondary envelope signal $-e_{nv}(t)$, having only alternative current components, expressed by Equation (18) is applied to the input terminal of the second delay circuit 14.

$$-e_{nv}(t) = -X_1(t) = -[K_1 \cdot \cos \{f(t-\tau) - f(t) - \omega_c \tau\}] \quad (18)$$

The secondary envelope signal $-e_{nv}(t)$ applied to the second delay circuit 14 is retarded by an interval corresponding to the delay time $\tau$ of the reflected wave $C_R(t)$ with respect to the direct wave $C_D(t)$. The delay time is caused by the difference in the propagation paths of the direct wave $C_D(t)$ and the reflected wave $C_R(t)$. The second delay circuit 14 is utilized for the following reason:

When the magnitude of the direct wave $C_D(t)$ is smaller than that of the reflected wave $C_R(t)$, the detected signal $e_1(t)$ derived from the FM detector 2 comprises a delayed signal component $f'(t-\tau)$ and distortion components $D_{is}(t)$; the components are summed together. Included in the distortion components $D_{is}(t)$ are a signal component $f'(t-\tau)$ of the reflected wave $C_R(t)$ having no distortion components, and a signal component $f'(t)$ of the direct wave $C_D(t)$ having no distortion component these components are formed as a difference signal expressed in terms of $\{f'(t-\tau)-f'(t)\}$.

This difference signal has to be extracted in order to produce a compensation signal with which the multipath distortion is cancelled. However, when it is intended to obtain both the components f'(t−τ) and f'(t), it is impossible to extract f'(t), while f'(t−τ) is actually obtained, since f'(t) precedes f'(t−τ) with respect to time. According to the present invention, therefore, the actually obtained signal f'(t−τ) is further retarded by an interval to produce a signal expressed by f'(t−2τ). The difference signal {f'(t−τ)−f'(t)} is obtained by use of the further retarded signal f'(t−2τ) and the actually obtained signal f'(t−τ) which precedes the further retarded signal. For this reason both the first and second delay circuits 12 and 14 are provided and the functions thereof are described in detail infra.

The output signal, i.e. a retarded envelope signal $-e_{nv}(t-\tau)$, of the second delay circuit 14 is expressed by the following equation:

$$-e_{nv}(t-\tau) = -X_1(t-\tau) = -[K_1 \cdot \cos\{f(t-2\tau)-f(t-\tau)-\omega_c \tau\}] \quad (19)$$

This retarded envelope signal $-e_{nv}(t)$ is applied to the function generator 6 having a hyperbolic transfer function so that the output signal of the function generator 6 is expressed by the following equation:

$$-\left\{\frac{X_1(t-\tau)}{1+2X_1(t-\tau)}\right\} = \quad (20)$$
$$-\frac{K_1 \cdot \cos\{f(t-2\tau)-f(t-\tau)-\omega_c \cdot \tau\}}{1+2K_1 \cdot \cos\{f(1-2\tau)-f(t-\tau)-\omega_c \cdot \tau\}}$$

On the other hand, the output signal $e_1(t)$ of the FM detector 2 is respectively applied to the first delay circuit 12 and to the second operational circuit 15. The output signal $e_1(t-\tau)$ of the first delay circuit 12, which is obtained by retarding the input signal $e_1(t)$ by an interval τ, is expressed by the following formula:

$$e_1(t-\tau) = f(t-2\tau) \quad (21)$$
$$-\{f(t-2\tau)-$$
$$f(t-\tau)\}\frac{K_1 \cos\{f(t-2\tau)-f(t-\tau)-\omega_c \cdot \tau\}}{1+2K_1 \cos\{f(t-2\tau)-f(t-\tau)-\omega_c \cdot \tau\}}$$

This signal $e_1(t-\tau)$ may be referred to as a retarded detected signal and is applied to the first operational circuit 13 so that a compensation signal $-D_{is}(t-\tau)$ produced by the analog multiplier 7 is subtracted from the retarded detected signal $e_1(t-\tau)$.

The retarded detected signal $e_1(t-\tau)$ is applied to the inverting input terminal (−) of the second operational circuit 15 where it is subtracted from the detected signal f'(t−2τ) which does not include multipath distortion components, as derived from the output terminal 9. Although the detected signal $e_1(t)$ from the FM detector 2 is expressed by Eq. (15), the detected signal $e_1(t)$ applied to the second operational circuit 15 can be treated as $e_1(t) \approx f'(t-\tau)$ under the condition of $K_1 < 1$ for the following reason: The analog multiplier 7 switches the output signal of the function generator 6 by the output signal of the second operational circuit 15 in the same manner as in the first arrangement, while the magnitude of the distortion components $D_{is}(t)$ is less than that of the detected signal f'(t−τ). Therefore, the distortion component $D_{is}(t)$ is negligible in connection with the detected signal $e_1(t)$ applied to the second operational circuit 15. Accordingly, it can be considered that the output signal of the second operational circuit 15 is expressed in terms of {f'(t−2τ)−f'(t−τ)}, and this signal is applied to the analog multiplier 7.

With this operation, a compensation signal $-D_{is}(t-\tau)$ expressed by the following formula is developed at the output terminal of the analog multiplier 7:

$$-D_{is}(t-\tau) = -\{f'(t-2\tau) - \quad (22)$$
$$f'(t-\tau)\}\frac{K_1 \cdot \cos\{f(t-2\tau)-f(t-\tau)-\omega_c \cdot \tau\}}{1+2K_1 \cdot \cos\{f(t-2\tau)-f(t-\tau)-\omega_c \cdot \tau\}}$$

This compensation or offset signal $-D_{is}(t-\tau)$ is fed to the inverting input terminal (−) of the first operational circuit 13 so that the compensation signal is subtracted from the retarded detected signal $e_1(t-\tau)$ derived from the first delay circuit 12. As the result of the subtraction, a detected signal f'(t−2τ) having no multipath distortion components is obtained at the output terminal of the first operational circuit 13 and is fed to the output terminal 9; the detected signal at the output terminal 9 is expressed by Equation (23) which is obtained by use of Eq. (21) and Eq. (22):

$$e_1(t-\tau) - \{-D_{is}(t-\tau)\} = f'(t-2\tau) \quad (23)$$

The above analysis has been described in connection with the constructions and operations of the first and second arrangements respectively illustrated in FIG. 1 and FIG. 2. As described infra according to the present invention, the first and second arrangements are combined in a single arrangement which comprises a plurality of switches for selectively switching the first and second arrangements. However, the single arrangement illustrated in FIG. 5 is not a mere combination or addition of the first and second arrangements. Namely, various circuits, such as the FM detector 2, the AGC circuit 3, the envelope detector 4, the function generator 6, and the analog multiplier 7, are used in common for the first and second arrangements.

Reference is now made to FIG. 5, a block diagram of a preferred embodiment of the multipath distortion compensation circuit according to the present invention. The embodiment of FIG. 5 comprises an input terminal 1, an FM detector 2, an AGC circuit 3, an envelope detector 4, a capacitor 5, a function generator 6, an analog multiplier 7, first and second operational circuits 17 and 18, first and second variable delay circuits 19 and 20, a series of switches $SW_1$, $SW_2$, $SW_3$, $SW_4$ and an output terminal 9. The elements and circuits which are substantially the same as those in the first and second arrangements are designated by the same reference numerals. The switches $SW_1$ to $SW_4$ may be replaced by a gang switch, a series of relays or semiconductor switches; each of the switches $SW_1$ to $SW_4$ is shown to have a movable contact and first and second stationary contacts a and b. These switches $SW_1$ to $SW_4$ are interlocked or gang controlled in operation so that all of the movable contacts of the switches $SW_1$ to $SW_4$ assume either the contact a side or contact b side simultaneously. Furthermore, these switches $SW_1$ to $SW_4$ are manually operable (in case relays or semiconductor switches are used, these switches are controlled by another manual switch) so that the operator or the user of the multipath distortion compensation circuit manipulates a knob of a switch or switches, depending on whether the magnitude of the direct wave $C_D(t)$ is greater or less than that of the reflected wave $C_R(t)$.

The first operational circuit 17, which may be a subtractor, serves as the first operational circuit 8 or 13 of the first or second arrangement, while the second operational circuit 18 serves as the second operational circuit 11 or 15 of the first or second arrangement. The first variable delay circuit 19 functions as the delay circuit 10 or 12 of the first or second arrangement, while the second variable delay circuit 20 corresponds to the second delay circuit 14 of the second arrangement of FIG. 2. The first and second variable delay circuits 19 and 20 are electrically interlocked so that the amount of delay of each circuit is simultaneously changable at will by adjusting the time constants thereof.

Since the connections of the FM detector 2, the AGC circuit 3, the envelope detector 4, and the capacitor 5 is the same as those of FIG. 1 and FIG. 2, the description thereof is omitted. The output terminal of the FM detector 2 is connected to the first stationary contact a of the first switch $SW_1$, and to the second stationary contacts b of the second and third switches $SW_2$ and $SW_3$. The movable contact of the first switch $SW_1$ is connected to a noninverting input terminal (+) of the first operational circuit 17, the output terminal of which is connected to the output terminal 9. The movable contact of the second switch $SW_2$ is connected to an input terminal of the first variable delay circuit 19, the output terminal of which is connected to the second stationary contact b of the first switch $SW_1$ and to the first stationary contact a of the third switch $SW_3$. The first stationary contact a of the second switch $SW_2$ is connected to the output terminal 9 which is further connected to a noninverting input terminal (+) of the second operational circuit 18. The movable contact of the third switch $SW_3$ is connected to an inverting input terminal (−) of the second operational circuit 18, the output terminal of which is connected to a second input terminal of the analog multiplier 7.

On the other hand, the output terminal of the envelop detector 4 is connected via the capacitor 5 to the first stationary contact a of the fourth switch $SW_4$. Stationary contact a is also connected to an input terminal of the second variable delay circuit 20, the output terminal of which is connected to the second stationary contact b of the fourth switch $SW_4$. The movable contact of the fourth switch $SW_4$ is connected to an input terminal of the function generator 6, the output terminal of which is connected to the first input terminal of the analog multiplier 7. The output terminal of the analog multiplier 7 is connected to the inverting input terminal (−) of the first operational circuit 17.

The operation of the embodied circuit of FIG. 5 in described infra. As mentioned before, it is necessary to manipulate the switches $SW_1$ to $SW_4$, depending on whether or not the magnitude of the direct wave wave $C_D(t)$ is greater than that of the reflected wave $C_R(t)$. If the magnitude of the direct wave $C_D(t)$ is greater than that of the reflected wave $C_R(t)$, the operator or user turns the movable contacts of the switches $SW_1$ to $SW_4$ to the contact a side as illustrated. Under this condition, the arrangement of FIG. 5 is substantially the same as that of the first arrangement of FIG. 1. A suitable meter (not shown) may be coupled to the output terminal 9 to measure the amount of distortion components still contained in the output signal. The user of the circuit adjusts the delay time of the first variable delay circuit 19 in such a manner that the amount of distortion indicated by the meter becomes minimum.

When the delay time of variable delay circuit 19 equals the delay time of the reflected wave $C_R(t)$ with respect to the direct wave $C_D(t)$, which delay time difference is caused by the difference in the propagation paths thereof, the multipath distortion is reduced or removed and thus a detected signal expressed in terms of f′(t) is developed at the output terminal 9.

If a received radio wave, such as an FM broadcast wave under the above described conditions has reflected wave $C_R(t)$ magnitude greater than the magnitude of the direct wave $C_D(t)$, the distortion components contained in the detected signal do not decrease but are apt to increase as the delay time by the variable delay circuit 19 is increased and decreased. Therefore, the user of the circuit is able to ascertain that the magnitude of the reflected wave $C_R(t)$ is greater than that of the direct wave $C_D(t)$ so that the user manipulates the switches $SW_1$ to $SW_4$ in such a manner that the movable contacts thereof are turned to the contact b side. With this operation, the circuit of FIG. 5 is substantially the same as the second arrangement of FIG. 2 and functions in the same manner as described supra in connection with FIG. 2. The user adjusts the delay times of the first and second variable delay circuits 19 and 20 in such a manner that the distortion components contained in the output detected signal at the output terminal 9 become a minimum, as in the same manner described above. As the result of a adjustment of the delay times, a detected signal f′(t−2τ) having negligible or no multipath distortion components is obtained at the output terminal 9.

From the foregoing, it will be understood that according to the present invention, the first arrangement of FIG. 1 and the second arrangement of FIG. 2 are selectively used by switching these circuits, while many of the circuits in the first and second arrangements are used in a common circuit, resulting in the reduction of the number of elements and circuits. Furthermore, because of the particular wiring in connection with the switches $SW_1$ to $SW_4$, the number of switches and the number of the contacts thereof are the minimized.

Although in the above described embodiment, the input terminal 1 is connected to the FM detector 2 and the AGC circuit 3, the position of the AGC circuit 3 is not limited to this arrangement. Namely, the input terminal 1 can be connected to only the AGC circuit 2, if the output terminal of the AGC circuit 3 is connected to the input terminal of the FM detector 2 and to the input terminal of the envelope detector 4.

Furthermore, in the above embodiment, although the first and second operational circuits 17 and 18 respectively function as subtractors, these operational circuits 17 and 18 may be arranged to function as adders.

In addition, the output signal of the AGC circuit 3 may be detected by the envelope detector 4 in the form of positive polarity signal. In this case, the function generator 6 has to be arranged such that the input signal thereof is compressed as a hyperbolic function passing through the origin of an X-Y co-ordinate system, which hyperbolic function is expressed in terms of $$Y = X/(1+2X)$$

Such a function generator may be readily constructed by changing the polarity of the diode D in the circuit of FIG. 4.

The extent of the multipath distortion components included in the detected output signal may be determined by listening to the reproduced audio signals if the modulation signal f'(t) is an audible signal. In this case, therefore, the user of the circuit may adjust the delay time without watching the distortion meter.

In the particularly disclosed embodiment, the function generator 6 has a hyperbolic the expansion or compression characteristic to completely eliminate the distortion components. However, an expansion characteristic or a compression characteristic of a similar function may be used in place of a hyperbolic function to provide an approximate function that enables a detected output signal to have negligibly small multipath distortion.

What is claimed is:

1. A multipath distortion compensation circuit comprising:
   (a) a demodulator responsive to an angle modulated signal for producing a demodulated signal at its output terminal;
   (b) an automatic gain control circuit responsive to said angle modulated signal for maintaining the average magnitude of said angle modulated signal constant;
   (c) an envelope detector responsive to the output signal of said automatic gain control circuit;
   (d) a capacitor for blocking direct current components contained in the output signal of said envelope detector;
   (e) a function generator for giving a predetermined characteristic to its input signal;
   (f) an analog multiplier having first and second input terminals and an output terminal, said first input terminal being responsive to the output signal of said function generator;
   (g) first and second operational circuits, each of which has first and second input terminals and an output terminal, said second input terminal of said first operational circuit being responsive to the output signal of said analog multiplier, said first input terminal of said second operational circuit being responsive to the output signal of said first operational circuit, and said second input terminal of said analog multiplier being responsive to the output signal of said second operational circuit;
   (h) first and second delay circuits, said second delay circuit being responsive to the output signal of said envelope detector through said capacitor; and
   (i) switching means which assumes first and second positions respectively, said switching means, when assuming said first position, connecting the output terminal of said demodulator to said first input terminal of said first operational circuit, the output terminal of said first operational circuit to the input terminal of said first delay circuit, the output terminal of said first delay circuit to said second input terminal of said second operational circuit, the output terminal of said envelope detector via said capacitor to the input terminal of said function generator, and on the other hand when assuming said second position, said switching means connecting the output terminal of said demodulator to the input terminal of said first delay circuit and to said second input terminal of said second operational circuit, the output terminal of said first delay circuit to said first input terminal of said first operational circuit, and the output terminal of said second delay circuit to the input terminal of said function generator.

2. A multipath distortion compensation circuit as claimed in claim 1, wherein said function generator comprises a series circuit of a capacitor and a diode connected between an input terminal and an output terminal, a first resistor connected between ground and the junction connecting said capacitor and said diode, a second resistor connected across said diode, and a third resistor connected between said output terminal and ground.

3. A multipath distortion compensation circuit as claimed in claim 1, wherein said function generator is a hyperbolic function generator which gives its input signal expansion characteristic of a hyperbola passing through the origin of a co-ordinate, which hyperbola is expressed in terms of: $Y=X/(1-2X)$.

4. A multipath distortion compensation circuit as claimed in claim 1, wherein said function generator is a hyperbolic function generator which gives its input signal compression characteristic of a hyperbola passing through the origin of a co-ordinate, which hyerbola is expressed in terms of: $Y=X/(1+2X)$.

5. A multipath distortion compensation circuit as claimed in claim 1, wherein said first and second delay circuits are of variable delay type.

6. A multipath distortion compensation circuit as claimed in claim 5, wherein said first and second delay circuits are electrically interlocked for varying the delay time of each delay circuit simultaneously.

7. A multipath distortion compensation circuit as claimed in claim 1, wherein said analog multiplier comprises a switching circuit for changing the polarity of said output signal of said function generator when the polarity of said output signal of said second operational circuit is either positive or negative.

8. A multipath distortion compensation circuit as claimed in claim 1, wherein each of said first and second operational circuits comprises a subtractor.

9. A method of cancelling multipath interference distortion components included in a composite angle modulated signal produced by direct and indirect waves which are received by a receiving antenna, comprising the steps of:
   (a) demodulating said composite angle modulated signal to produce a demodulated signal;
   (b) maintaining the average magnitude of said composite angle modulated signal constant;
   (c) producing a signal indicative of the envelope of said composite angle modulated signal having constant average magnitude;
   (d) blocking direct current components contained in said signal indicative of said envelope to transmit only alternative current components;
   (e) giving a characteristic of a predetermined function to a first signal by means of a function generator to produce on output signal;
   (f) retarding a second signal by an interval by means of a first delay circuit to produce a first retarded signal;
   (g) retarding said alternative current components by said interval by means of a second delay circuit to produce a second retarded signal;
   (h) subtracting a compensation signal from a third signal by means of a first operational circuit for producing an output signal;
   (i) subtracting a fourth signal from said output signal of said first operational circuit by means of a second operational circuit to produce an output signal;

(j) analog multiplying said output signal of said function generator by said output signal of said second operational circuit for producing said compensation signal; and (k) switching said first, second, third and fourth signals respectively applied to said function generator, said first delay circuit, and said first and second operational circuits, for supplying said function generator with said alternative components as said first signal, supplying said first delay circuit with said output signal of said first operational circuit as said second signal, supplying said first operational circuit with said demodulated signal as said third signal, supplying said second operational circuit with said first retarded signal as said fourth signal when the magnitude of said direct wave is greater than that of said indirect wave, and on the other hand for supplying said function generator with said second retarded signal as said first signal, supplying said first delay circuit with said demodulated signal as said second signal, supplying said first operational circuit with said first retarded signal as said third signal, and supplying said second operational circuit with said demodulated signal as said fourth signal when the magnitude of said direct wave is less than that of said indirect wave.

10. A method of cancelling multipath interference distortion components as claimed in claim 9, wherein said function generator gives its input signal expansion characteristic of a hyperbola passing through the origin of a co-ordinate, which hyperbola is expressed in terms of: $Y = X/(1-2X)$.

11. A method of cancelling multipath interference distortion components as claimed in claim 9, wherein said function generator gives its input signal compression characteristic of a hyperbola passing through the origin of a co-ordinate, which hyperbola is expressed in terms of: $Y = X/(1+2X)$.

12. A method of cancelling multipath interference distortion components as claimed in claim 9, wherein said step of analog multiplying comprises the step of switching said output signal of said function generator by said output signal of said second operational circuit to change the polarity of said output signal of said function generator when the polarity of said output signal of said second operational circuit is either positive or negative.

13. A method of cancelling multipath interference distortion components as claimed in claim 9, further comprising the step of simultaneously changing the delay times of said first and second delay circuits to set the delay times at the delay time of said indirect wave with respect to said direct wave.

* * * * *